(12) United States Patent
Nishizaka et al.

(10) Patent No.: US 7,020,323 B2
(45) Date of Patent: Mar. 28, 2006

(54) PATTERN DEFECT INSPECTION APPARATUS AND METHOD

(75) Inventors: Takeshi Nishizaka, Kashiwa (JP); Toshiyuki Watanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 747 days.

(21) Appl. No.: 10/107,427

(22) Filed: Mar. 28, 2002

(65) Prior Publication Data
US 2002/0141634 A1 Oct. 3, 2002

(30) Foreign Application Priority Data
Mar. 29, 2001 (JP) .............................. 2001-095305

(51) Int. Cl.
*G06K 9/00* (2006.01)
(52) U.S. Cl. ........................ 382/148; 382/144; 700/110
(58) Field of Classification Search ................. 382/144, 382/145, 147, 148, 149, 256, 276, 195, 197, 382/199, 298; 430/5, 30; 356/237.1; 702/35; 700/110; 250/559.01, 559.04, 559.05, 559.06, 250/559.07, 559.08; 716/19, 21
See application file for complete search history.

(56) References Cited

U.S. PATENT DOCUMENTS 5,046,109 A * 9/1991 Fujimori et al. ............ 382/144
5,850,467 A * 12/1998 Matsui et al. ............... 382/145
6,504,947 B1 * 1/2003 Nozaki et al. .............. 382/148

OTHER PUBLICATIONS

Watanabe, T., "Pattern Inspection Equipment, Pattern Inspection Method, and Storage Medium Storing Pattern Inspection Program", U.S. Appl. No. 09/122,779, filed Jul. 27, 1998.

* cited by examiner

*Primary Examiner*—Bhavesh M. Mehta
*Assistant Examiner*—John Strege
(74) *Attorney, Agent, or Firm*—Finnegan, Henderson, Farabow, Garrett & Dunner, L.L.P.

(57) ABSTRACT

A pattern defect inspection apparatus comprises an image sensor that generates object pattern data corresponding to the pattern of an object, a design data generator that generates design data representing a pattern to be formed on the object, a resizing device which subjects the design data to expansion or shrinkage process to generate resized pattern data, the resizing device detecting a direction of the pattern in a specific region of the design data, aligning the direction of the pattern of the design data with a specific direction, and recognizing and classifying the shape of the pattern of the design data, and a determining device configured to determine the defect of the pattern by comparing the resized pattern data with the object pattern data.

18 Claims, 5 Drawing Sheets

PATTERN DEFECT INSPECTION APPARATUS AND METHOD

CROSS-REFERENCE TO RELATED APPLICATION

This application is based upon and claims the benefit of priority from the prior Japanese Patent Application No. 2001-095305, filed Mar. 29, 2001, the entire contents of which are incorporated herein by reference.

BACKGROUND OF THE INVENTION

1. Field of the Invention

The present invention relates to an apparatus which inspects patterns formed on objects, particularly to a pattern defect inspection apparatus which inspects defects in patterns formed on objects such as photo masks employed in semiconductor manufacture and a pattern defect inspection method.

2. Description of the Related Art

As one of the causes of degradation of yield in the manufacture of large scale integration (LSI) is raised pattern defects occurring on the photo mask employed in producing a semiconductor device by the photolithography technique. Various types of pattern defect inspection apparatuses inspecting such defects have been developed and used already.

The patterns of photo masks to be inspected by the pattern defect inspection apparatus are formed by patterning a metal film of chrome (Cr) deposited on a glass substrate by means of exposure and etching processes. The quantity of undercut of the pattern, anisotropy, and pattern conversion difference changes according to patterning by wet etching, patterning by dry etching or the etching condition.

The sidewall of the actual mask pattern may not be a complete perpendicular sidewall. The optical measurement image of the pattern may not be a complete monochrome color code pattern. The boundary between the patterns may be blurred and the edge of the pattern may be unknown. In this case, the dimensions of the pattern, line width thereof or the position of a pattern edge varies to some extent from the pattern data of the design data that is the criteria of inspection. As a result, the pattern is recognized as a defect by the pattern defect inspection apparatus. For the purpose of solving this problem, the conventional pattern defect inspection apparatus develops pattern design data in pattern data, subjects the pattern data to a resizing process, and matches the pattern data with the pattern of the photo mask. In this resizing process method, design data used in drawing a pattern is developed to a grayscale pattern data. Then, the grayscale pattern data is classified into vertical and horizontal grayscale pattern data and diagonal grayscale pattern data on the basis of output results of a device for detecting a maximum level of grayscale pattern data and a device for detecting inclination of the pattern. The classified pattern data are revised individually.

As a result, the dimension or line width of the pattern data of the design data is matched with the pattern on the photo mask. The observed value obtained by detecting the transmitted light corresponding to the pattern formed on the photo mask by means of a sensor and the pattern data revised as described above are compared by defect detecting means to detect a defect.

However, this kind of pattern defect inspection apparatus includes the following problem. In other words, the grayscale pattern data is classified into vertical and horizontal grayscale pattern data and diagonal grayscale pattern data when the grayscale pattern data obtained from the design data and pattern of the photo mask are matched with each other. However, a proper resizing process cannot be performed in a small change part (corner part) of the pattern data of OPC (Optical Proximity Correction) patterns and so on, which have become more and more complicated recently. For this reason, the small change part of pattern data may be detected as a nuisance defect of pattern data.

As described above, the conventional pattern defect inspection apparatus compares the grayscale pattern data obtained by developing, by means of a pattern developing device, the design data used when drawing a pattern on the photo mask, with the measurement data generated by optically scanning a pattern drawn on the photo mask. For this reason, the conventional pattern defect inspection apparatus has problems such that it is impossible to perform matching of pattern data in correspondence with the subtle change of a pattern occurring by the etching process and complicated pattern shape, in the resizing process.

BRIEF SUMMARY OF THE INVENTION

It is an object of the present invention to provide a pattern defect inspection apparatus, which performs inspection of good precision without generating a nuisance defect.

According to an aspect of the invention, there is provided a pattern defect inspection apparatus which inspects a defect of a pattern formed on an object, comprising: an image sensor configured to capture the object and generate object pattern data corresponding to the pattern of the object; a design data generator configured to generate design data representing a pattern to be formed on the object; a resizing device which resizes the design data by subjecting the design data to an expansion or shrinkage process to generate resized pattern data, the resizing device detecting a direction of the pattern in a specific region of the design data, aligning the direction of the pattern of the design data with a specific direction, and recognizing and classifying the shape of the pattern of the design data; and a determining device configured to determine the defect of the pattern formed on the object by comparing the resized pattern data with the object pattern data.

According to the second aspect of the invention, there is provided a pattern defect inspection method which inspects a defect of a pattern formed on an object, comprising: generating object pattern data corresponding to the pattern of the object; generating design data representing a pattern to be formed on the object; resizing the design data by subjecting the design data to an expansion or shrinkage process to generate resized pattern data, the resizing including detecting a direction of the pattern represented by the design data in a specific region, aligning the direction of the pattern with a specific direction, and recognizing and classifying the shape of the pattern; and determining the defect of the pattern formed on the object by comparing the resized pattern data with the object pattern data.

DETAILED DESCRIPTION OF THE INVENTION

An embodiment of the present invention will be described referring to drawings.

Figure 1:
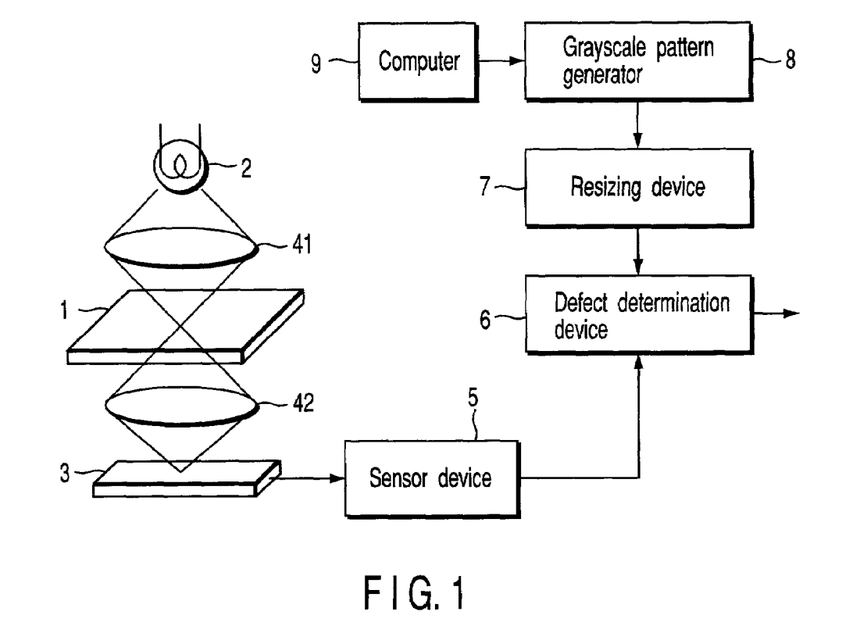
FIG. 1 shows a schematic configuration of a pattern inspection apparatus according to one embodiment of the present invention.

A pattern defect inspection apparatus shown in FIG. 1 comprises an optical measurement system which includes an X-Y table (not shown) on which a photo mask as an examination object is put, a light source 2 which irradiates an examination light on the photo mask, and a sensor 3 such as a photodiode array which detects a light passing through the photo mask 1.

In this optical measurement system, a condenser lens 41 that converges the light on the photo mask 1 is disposed under the X-Y table. An objective lens 42 that converges the light on the sensor 3 is disposed on the X-Y table. The sensor 3 is connected to a sensor device 5, which is connected to a defect determination device 6.

Figure 2:
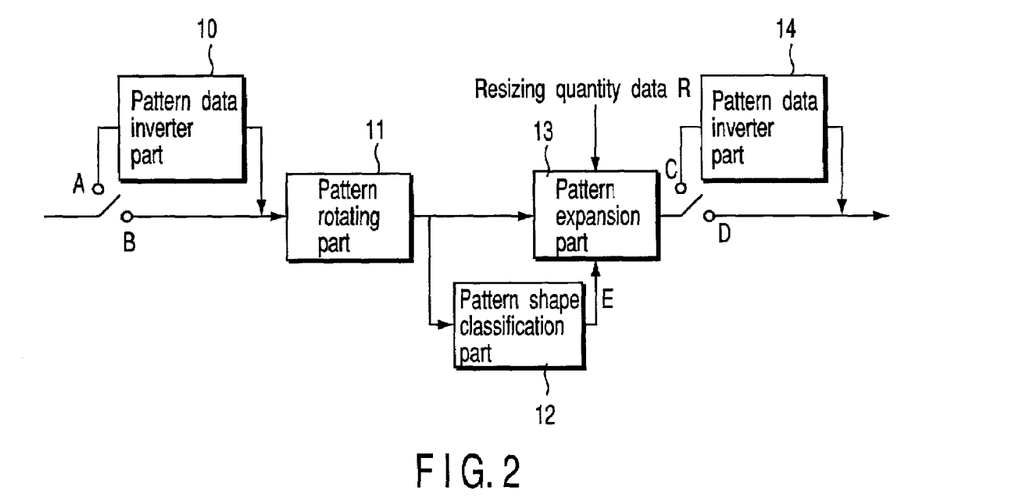
FIG. 2 shows a block diagram of the resizing device used for the embodiment of FIG. 1.

The pattern inspection apparatus comprises a computer 9 to which a grayscale pattern generator 8 is connected. The grayscale pattern generator 8 is connected to a resizing device 7 constructed as shown in FIG. 2. This resizing device 7 is connected to the defect determination device 6, which compares measured data from the sensor device 5 with grayscale pattern data from the resizing device 7 to determine the presence of a pattern defect. A magnetic disk unit (not shown) that stores pattern design data is connected to the computer 9.

In a configuration shown in FIG. 1, light is irradiated to the photo mask 1, on which a pattern is formed, by the light source 2. The light passed through the photo mask 1 forms an optical image of a pattern on the sensor 3 through the objective lens 42. The sensor device 5 connected to the sensor 3 measures the image of the pattern. The measured data (sensor data) measured in this way is subjected to analog-to-digital conversion in the sensor device 5 and sent to the defect determination device 6.

The sensor data subjected to analog-to-digital conversion is filtered due to the blur occurring in an observation optical system. In other words, even if an edge of the mask pattern is sharp, the sensor data is not data corresponding to a complete square wave, but blurred data.

The blur occurring in the observation optical system results from resolution of the optical lens, aperture property or interference (aperture effect) in adjacent pixels in the sensor. The design data of a pattern are sent to the grayscale pattern generator 8 from the computer 9, and developed to grayscale pattern data by the grayscale pattern generator 8, and then to the resizing device 7.

The pattern design data is converted to grayscale pattern data corresponding to a pattern whose pattern edge is slightly changed in position in the etching process of the photo mask, and sent to the defect determination device 6.

In the pre-stage of the defect determination device 6, the resized design data is compensated in blur so as to correspond to the blur due to the sensor. In other words, the resized data is subjected to weighted addition or multivalued process using a point spread function, to approximate to the blur of the sensor data, which results from the blur due to the observation optical system.

In this way, the observational data (pattern image) of the photo mask 1 sent from the sensor device 5 and the pattern data obtained after blur correction of the design data sent from the resizing device 7 are compared with each other by the rear stage of the defect determination device 6, to determine a defect on the photo mask 1.

The resizing device 7 comprises a first pattern data inverter part 10, a second pattern data inverter part 14, a pattern rotating part 11, a shape classification part 12, and a pattern expansion part 13 as shown in FIG. 2. The grayscale pattern data developed by the grayscale pattern generator 8 is supplied to the pattern rotating part 11 via the first pattern data inverter part 10 or directly. The pattern data corresponding to the pattern rotated by the pattern rotating part 11 is supplied to the shape classification part 12 and pattern expansion part 13. The pattern expansion part 13 expands the data according to the shape classified by the shape classification part 12. The data processed by the pattern expansion part 13 is supplied to the defect determination device 6 via the second pattern data inverter part 14 or directly.

In FIG. 2, a port "A" or "B" on the side of the pattern data inverter part 10 is selected according to shrinkage or expansion of the pattern data. Similarly, a port "C" or "D" on the side of the pattern data inverter part 14 is selected according to shrinkage or expansion of the pattern data. When the expansion process of pattern data is selected, the ports "B" and "D" are selected. In this case, the data passes by the data inverter parts 10 and 14. When the shrinkage process of pattern data is selected, the ports "A" and "C" are selected. In this case, if the maximum of the grayscale pattern data developed by the grayscale pattern generator 8 is, for example, "256," the data is reversed "0" to "256", "1" to "255", "256" to "0", respectively.

Figure 3:
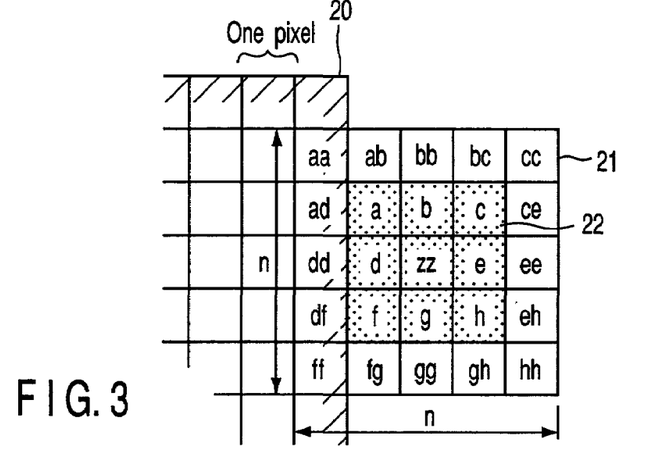
FIG. 3 shows a diagram for explaining a specific region of the pattern data.

The pattern rotating part 11 scans sequentially the grayscale pattern data 20 developed by the pattern expansion device 8 on the specific region (scan window) 21 of 5×5 pixels as shown in FIG. 3, and the direction of the pattern shape is determined based on data of, for example, 3×3 pixels 22 on the center of the scan window 21. The direction of the pattern shape may determined based on data of 5×5 pixels on the center of the scan window of 7×7 pixels. This determination is performed as follows.

Figure 4A:
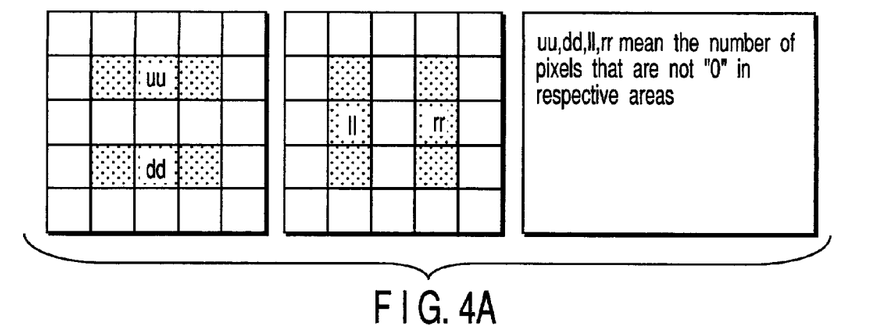
FIGS. 4A to 4C show charts for explaining the process of a pattern rotating part of the embodiment.

At first, the pixels in the scan window 22 in FIG. 3 are defined as a, b, c, d, zz, e, f, g, and h sequentially from upper left to lower right. The total number uu of the pixels that the values of pixels a, b and c are not "zero," the total number dd of pixels where the values of pixels f, g and h are not "zero", the total number ll of pixels where the values of pixels a, d and f are not "0" and the total number rr of the pixels that the values of pixels c, e and h are not "0" are counted as shown in FIG. 4A. Furthermore, the larger one of the total numbers uu and dd is indicated by maxud, and the larger one of the total numbers ll and rr by maxlr.

Figure 4B:
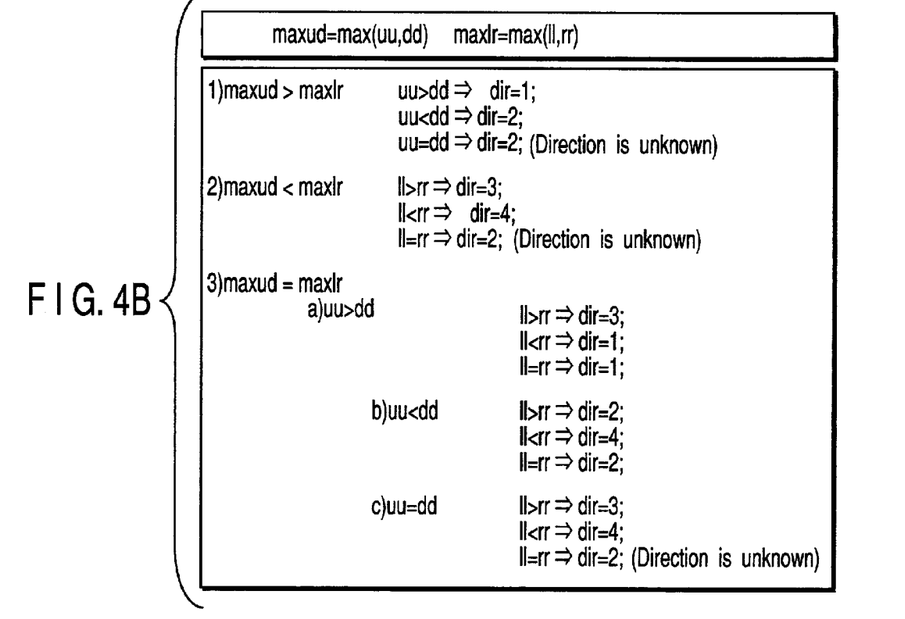

Based on relation of uu, dd, ll, rr, maxud, and maxlr, the direction of the graphical element in the scan window 21 is determined in accordance with the relation shown in FIG. 4B. The pattern data in the scan window 21 is rotated so that the direction of the graphical element directs to a certain specific direction, and pattern data of the rotated result is generated.

Figure 4C:
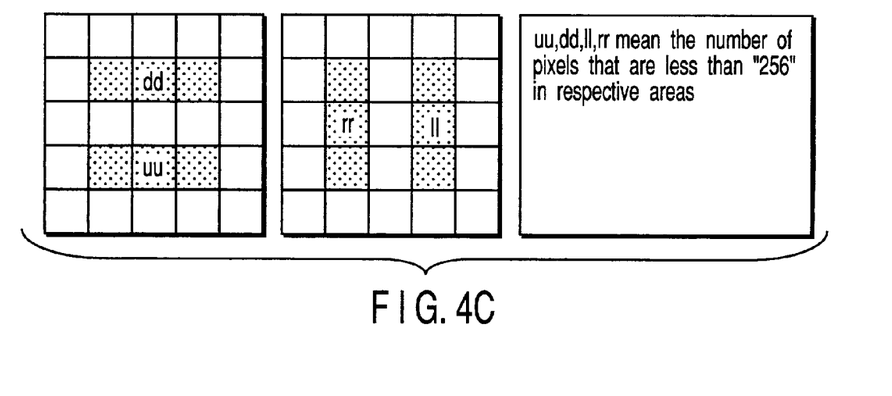
Figure 5:
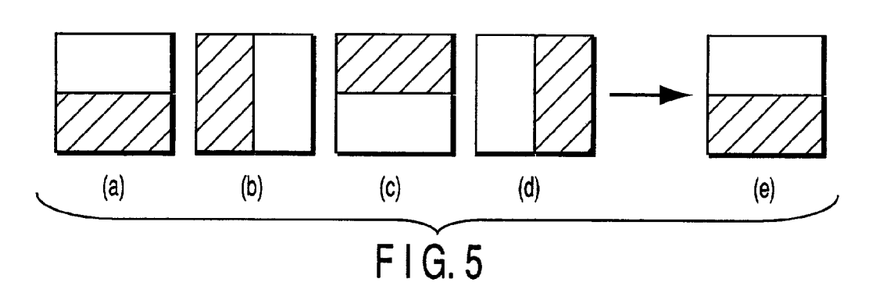
FIG. 5 shows diagrams for explaining pattern rotating.

FIG. 5 shows images obtained by rotating pattern data of the scan window 21 to a specific direction. Images a to d weighted on lower, left, upper, and right sides, respectively, are rotated to the image e weighted on the lower side. When no pixel value "0" is included in the scan window 22, the total number dd of pixels where the values of the pixels a, b and c in the scan window 22 are less than "256", the total number uu of pixels where the values of the pixels f, g, h are less than "256", the total number rr of pixels that the values of pixels a, d and f are less than "256", and the total number ll of pixels where the values of pixels c, e and h are less than "256" are counted as shown in FIG. 4C.

The larger one of the total numbers uu and dd is indicated by maxud, and the larger one of the total numbers ll and rr by maxlr. Based on relation of these uu, dd, ll, rr, maxud, and maxlr, the direction of the graphical element in the scan window 21 is determined in accordance with the relation shown in FIG. 4B.

The pattern data in the scan window 21 is rotated so that the direction of the graphical element directs to a certain specific direction, and pattern data of the rotated result is generated. In this time, the positional relationship between uu and dd and that between ll and rr are reversed in the case where a "0" pixel exists in the scan window 22 and the case where no "0" pixel exists therein. This is because the logic is reversed between a case that the number of pixels whose pixel value is not "0" is counted, and a case that the number of pixels whose pixel value is less than "256" is counted. This method can detect the direction of graphical elements in the scan window 21 by completely the same decision.

Figure 6A:
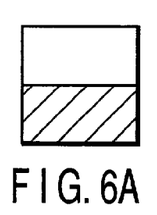
FIGS. 6A to 6S show graphical elements classified by a shape classification part of the embodiment.
Figure 6B:
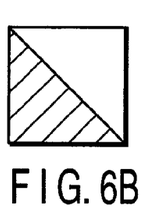
Figure 6C:
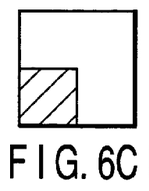
Figure 6D:
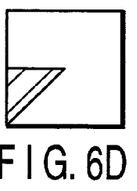
Figure 6E:
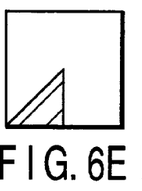
Figure 6F:
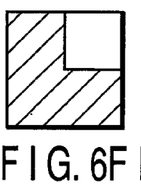
Figure 6G:
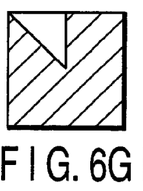
Figure 6H:
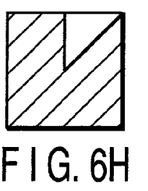
Figure 6I:
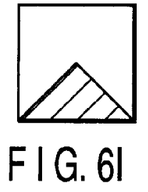
Figure 6J:
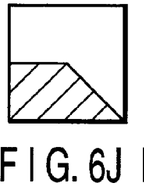
Figure 6K:
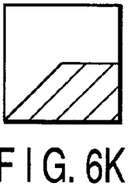
Figure 6L:
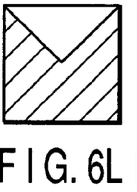
Figure 6M:
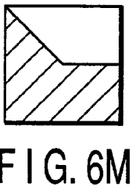
Figure 6N:
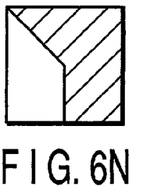
Figure 6O:
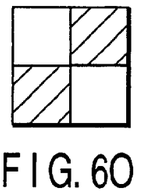
Figure 6P:
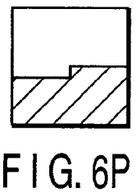
Figure 6Q:
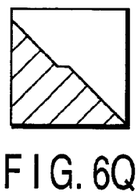
Figure 6R:
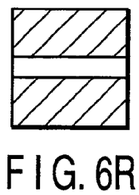
Figure 6S:
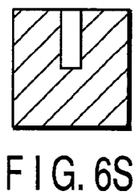

The pattern shape classification part 12 converts pattern data in the scan window 21 into binary pattern data, and classifies the pattern shape from distribution of binary pattern data. FIGS. 6A to 6S show examples of pattern shapes to be classified.

Figure 7:
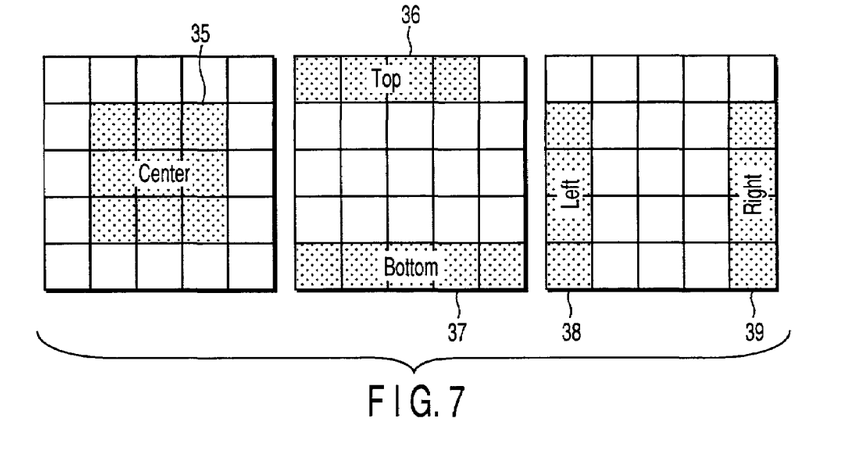
FIG. 7 shows diagrams for explaining the process of the shape classification part of the embodiment.

When the pattern shape is determined, the shape classification may be performed directly from distribution of binary data of all pixels in the scan window 21. However, the horizontal pattern edge shown in FIG. 6A, diagonal pattern edge shown in FIG. 6B, etc. can be determined from distribution of binary pattern data in the scan window 22. For this reason, the window is divided into regions of CENTER 35, TOP 36, BOTTOM 37, LEFT 38, and RIGHT 39 as shown in FIG. 7, and the shape is classified by CENTER 35 basically. When the shape cannot be determined only by the CENTER 35, the shape classification is performed using any one or some of the regions TOP 36, BOTTOM 37, LEFT 38, and RIGHT 39.

The classified pattern shapes are numbered by different pattern class numbers E as shown in FIG. 2. Actually, the pattern shapes are numbered by different pattern class numbers E so that the pattern expansion part 13 can recognize the shape of the pattern data on the basis of the pattern class number E.

The pattern expansion part 13 expands the grayscale pattern rotated in a certain specific direction by the pattern rotating part 11 on the basis of the pattern data, the pattern class number E sent by the pattern shape classification part 12, and the resizing quantity R indicated by the computer 9. Since the resizing quantity R is determined by the manufacturing process of masks, the resizing quantity R corresponding to a specific manufacturing process may be determined beforehand, and the resizing quantity corresponding to an object to be examined is selected.

An example of the resizing process in the present embodiment will be described referring to FIGS. 8A and 8B. This is an example of a resizing process of a 45 degrees corner portion. The pattern is scanned in the scan window 21 to extract pixel data of 5×5 pixels. The pattern of 5×5 pixels is rotated in a given direction based on the extracted pixel data by the pattern rotating part 11. The shape classification part 12 classifies the pattern shape of the rotated pattern. The pattern class number E corresponding to the pattern shape is output by the pattern expansion part 13. The pattern expansion part 13 calculates the value of the center pixel zz using this pattern class number E and the resizing quantity R specified by the computer 9. The wording "center pixel" means a pixel located centrally of the scan window (cf. FIG. 3).

Figure 8A:
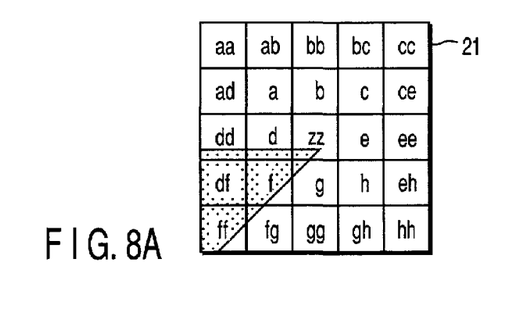
FIGS. 8A and 8B show diagrams for explaining the process of a pattern expansion part of the embodiment.
Figure 8B:
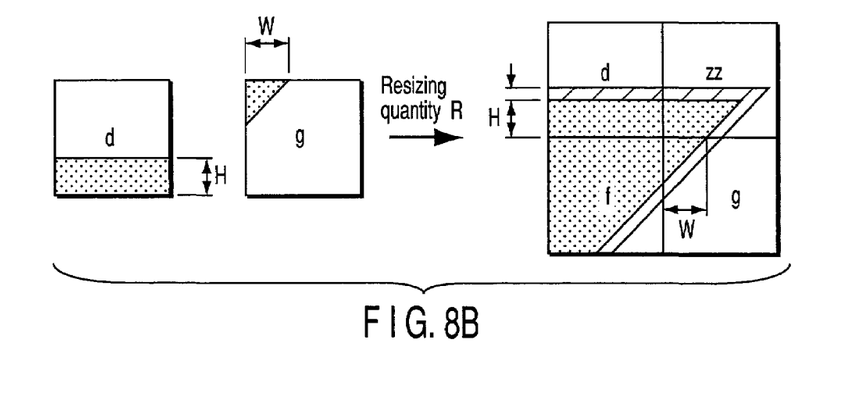

At first, the pattern shape is recognized to have a distribution shown in FIG. 8A by the pattern class number E. The height H of the pattern within the pixel d is computed from the pixel value of the pixel d as shown in FIG. 8B. The passage point W of the diagonal edge within the pixel g is computed from the value of the pixel g. Therefore, the shape of center pixel zz and pixel value can be grasped from the height H and passage point W of the diagonal edge pattern.

The pattern assumes to be expanded by the resizing quantity R, and the value of the resized center pixel zz is computed. The present embodiment describes the resizing process that shrinks and expands the pattern data in a range of not more than one pixel. However, when the resizing process for shrinking and expanding the pattern data in a range of more than one pixel is performed, the resizing process for the range of not more than one pixel may be repeated. This depends on the following reasons. In other words, when the resizing quantity R per one resizing process is set to one pixel (256 gray levels), original pattern data necessary for calculating the center pixel value zz of the scan window 21 which positions at the apex of a triangle is not obtained. Accordingly, the resizing process cannot be executed. In contrast, when the resizing quantity R per one resizing process is set to a value more than one pixel, resizing process can be faithfully performed based on the original pattern data overlapped on the plural pixels of the scan window 21.

Figure 9A:
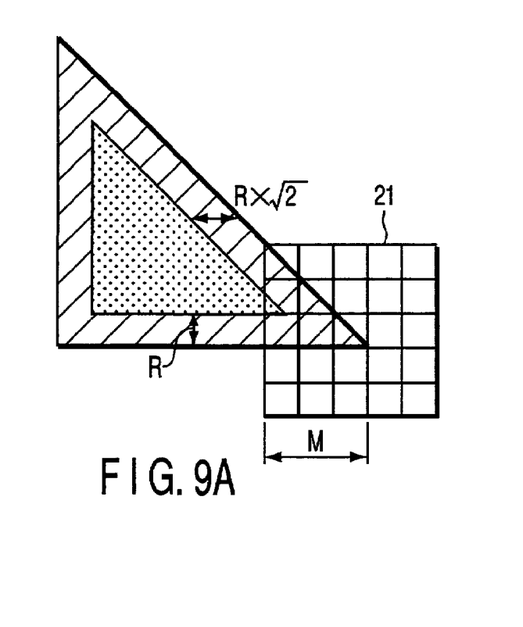
FIGS. 9A and 9B show relationships between a resizing quantity and dimension of a scan window.
Figure 9B:
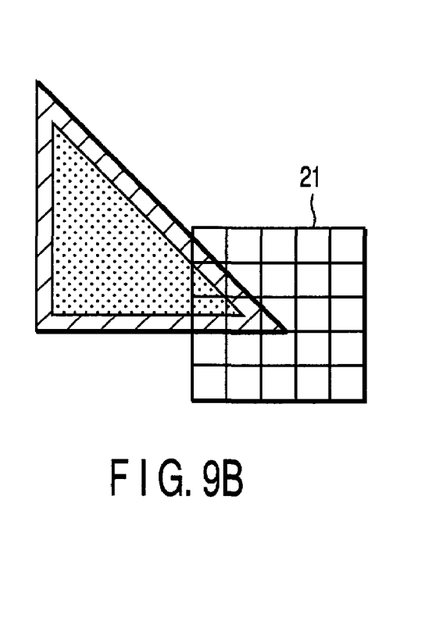

The relationship between the scan window 21 and maximum resizing quantity R is as follows. In other words, if the gray level of one pixel is N, the length of one side of the pixel is "$\sqrt{N}$". The number of pixels from the center pixel of the scan window to the side end thereof is "M". The corner part of 45 degrees shape is the severest. It is necessary that the basis pattern shape be inside the scan window by two pixels from the scan window edge in order to determine the pattern shape.

The resizing process calculates a value with respect to the center pixel. Therefore, when the resizing process is performed with the status that the basis pattern is closely inside the scan window by two pixels from the scan window edge, the distance calculated by "$(M-2) \times \sqrt{N}$" that is closely inside the center pixel corresponds to the maximum distance including no error. When the 45° pattern is resided by the resizing quantity R, the vertex position of the corner moves by the value represented by the following equation:

$$R + R\sqrt{2} = R(1+\sqrt{2}) \qquad (1).$$

The relationship between the maximum resizing distance "r'" and the number of pixels "M" using the relation of equation (1) is represented by the following equation (2).

$$(M-2) \times \sqrt{N} \geq r' \times (1+\sqrt{2})$$

$$r' \leq (M-2) \times \sqrt{N}/(1+\sqrt{2}) \qquad (2)$$

Therefore, the maximum resizing quantity r (pixel) is represented by the following equation (3).

$$r = r'/\sqrt{N} \qquad (3)$$

According to the embodiment of the present invention as described above, an image sensor captures an object such as a photo mask on which a pattern is formed, so that pattern data is generated. Further, the design data of the pattern formed on the photo mask is generated. This design data is converted into pattern data and subjected to the resizing process. In this resizing process, the direction of the pattern data is detected in a specific region, for example, region of 5×5 pixels. The pattern represented by the pattern data is rotated in order to match the direction of the pattern of this region with a specific direction. The shape represented by the pattern data is recognized and classified. The pattern data is resized by being expanded or shrunk according to the classified shape. The resized pattern data is compared with the object pattern data, so that a defect of the object pattern, for example, a photo mask pattern is inspected.

As thus described, if the design pattern data in a specific region is subjected to the resizing process, minute deformation of the pattern edge of the object is not detected as nuisance defects but the defect of the object pattern can be inspected with precision.

In the above embodiment, the pattern data inverter parts are provided on the pre-stage and rear stage of the resizing device. If the resizing device can perform both expansion and shrinkage, the pattern data inverting device is not necessary. The pattern rotating part may be a part configured to adjust the direction of the pattern by detecting the direction of the pattern in the specific region of the grayscale pattern based on the pattern data. The pattern shape classification part may be a part configured to recognize and classify the shape represented by the grayscale pattern data that is matched with a predetermined direction.

According to the present invention as discussed above, a resizing device configured to resize the pattern data generated by the pattern data generating device is provided. The resizing device detects the direction of the pattern in a specific region based on the pattern data, and matches the direction with a predetermined direction. Furthermore, the resizing device recognizes and classifies the shape represented by the pattern data, and performs expansion/shrinkage according to the classified shape. As a result, the present invention can provide a pattern inspection apparatus wherein the pattern data matching corresponding to a subtle change of a pattern on the photo mask caused by the etching process is possible, and which satisfies the needs of various inspections and has a high utility.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern defect inspection apparatus which inspects a defect of a pattern formed on an object, comprising:
   an image sensor configured to capture the object and generate object pattern data corresponding to the pattern of the object;
   a design data generator configured to generate design data representing a pattern to be formed on the object;
   a resizing device which resizes the design data by subjecting the design data to expansion or shrinkage process to generate resized pattern data, the resizing device detecting a direction of the pattern in a specific region of the design data, aligning the direction of the pattern of the design data with a specific direction, and recognizing and classifying the shape of the pattern of the design data; and
   a determining device configured to determine the defect of the pattern formed on the object by comparing the resized pattern data with the object pattern data.

2. A pattern defect inspection apparatus according to claim 1, wherein the design data generator generates grayscale pattern data corresponding to the design data.

3. A pattern defect inspection apparatus according to claim 2, wherein the specific region includes 5×5 pixels to 7×7 pixels.

4. A pattern defect inspection apparatus according to claim 3, wherein the resizing device determines the direction of the pattern based on data of a region of 3×3 pixels to 5×5 pixels which is smaller than the specific region and on a center of the specific region.

5. A pattern defect inspection apparatus according to claim 2, wherein the resizing device subjects the design data to expansion or shrinkage process executed in a range less than one pixel one time, or repeats the expansion or shrinkage process executed in a range less than one pixel.

6. A pattern defect inspection apparatus according to claim 1, which further includes a first pattern data reversing device provided on a pre-stage of the resizing device and selected according to the expansion or shrinkage process, and a second pattern data reversing device provided on a rear stage of the resizing device and selected in synchronism with selection of the first pattern data reversing device.

7. A pattern defect inspection apparatus according to claim 1, wherein the resizing device includes a pattern shape classification part configured to convert the design data in the specific region into binary pattern data, and classify the pattern shape from distribution of binary pattern data.

8. A pattern defect inspection apparatus according to claim 1, wherein the specific region is divided into a plurality of sections including a central section, and the resizing device includes a shape classification device configured to classify the shape using the central section basically.

9. A pattern defect inspection apparatus according to claim 8, wherein the resizing device includes a shape classification device configured to classify the shape using at least one of the sections.

10. A pattern defect inspection apparatus according to claim 1, wherein the resizing device includes a shape classification device configured to convert the design data in the specific region into binary pattern data, and classify the shape from distribution of the binary pattern data.

11. A pattern defect inspection apparatus according to claim 1, wherein the resizing device includes a shape classification device configured to classify the design data in a plurality of shapes and number the shapes by different class numbers and a pattern expansion device configured to recognize the shape of the design data on the basis of the class numbers.

12. A pattern defect inspection apparatus according to claim 1, wherein the resizing device includes a pattern rotating part which rotates the design data to align the direction of the pattern of the design data with the specific direction.

13. A pattern defect inspection apparatus according to claim 1, wherein the resizing device includes a pattern shape classification unit configured to convert the pattern data in the specific region into binary pattern data, and classify the pattern shape from distribution of binary pattern data.

14. A pattern defect inspection apparatus which inspects a defect of a pattern formed on an object, comprising:
- means for generating image data corresponding to the pattern of the object by capturing the object;
- means for generating grayscale pattern data corresponding to design data used for forming the pattern on the object;
- resizing means for resizing the grayscale pattern data by subjecting the grayscale pattern data to expansion or shrinkage process, to generate resized pattern data, the resizing means including means for detecting a direction of the pattern represented by the grayscale pattern data in a specific region, means for aligning the direction of the pattern with a specific direction, and means for recognizing and classifying a shape of the pattern; and
- means for determining the defect of the pattern formed on the object by comparing the image data with the resized pattern data.

15. A pattern defect inspection apparatus according to claim 14, wherein the resize means subjects the grayscale pattern data to an expansion or shrinkage process executed in a range less than one pixel one time, or repeats the expansion or shrinkage process executed in a range less than one pixel multiple times.

16. A pattern defect inspection apparatus according to claim 14, which further includes first pattern data reversing means provided on a pre-stage of the resizing means to be selected according to the expansion or shrinkage process, and second pattern data reversing means provided on a rear stage of the resizing means to be selected in synchronism with selection of the first pattern data reversing means.

17. A pattern defect inspection method which inspects a defect of a pattern formed on an object, comprising:
- generating object pattern data corresponding to the pattern of the object;
- generating design data representing a pattern to be formed on the object and formed of grayscale pattern data;
- resizing the design data by subjecting the design data to an expansion or shrinkage process to generate resized pattern data, the resizing including detecting a direction of the pattern represented by the design data in a specific region, aligning the direction of the pattern with a specific direction, and recognizing and classifying the shape of the pattern; and
- determining the defect of the pattern formed on the object by comparing the resized pattern data with the object pattern data.

18. A pattern defect inspection method according to claim 17, wherein resizing the design data includes subjecting the design data to an expansion or shrinkage process executed in a range less than one pixel one time, or repeating the expansion or shrinkage process executed in a range less than one pixel multiple times.

* * * * *